United States Patent
Abbott et al.

(10) Patent No.: US 11,624,929 B2
(45) Date of Patent: Apr. 11, 2023

(54) VIEWING DEVICE WITH DUST SEAL INTEGRATION

(71) Applicant: Magic Leap, Inc., Plantation, FL (US)

(72) Inventors: Michael Derek Abbott, Weston, FL (US); Aaron Mark Schuelke, Coral Springs, FL (US); Alejandro Lopez, Pembroke Pines, FL (US); Bach Nguyen, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 116 days.

(21) Appl. No.: 17/263,001

(22) PCT Filed: Jul. 23, 2019

(86) PCT No.: PCT/US2019/043097
§ 371 (c)(1),
(2) Date: Jan. 25, 2021

(87) PCT Pub. No.: WO2020/023543
PCT Pub. Date: Jan. 30, 2020

(65) Prior Publication Data
US 2021/0325682 A1    Oct. 21, 2021

Related U.S. Application Data

(60) Provisional application No. 62/702,731, filed on Jul. 24, 2018.

(51) Int. Cl.
*G02B 27/01* (2006.01)
*H04N 5/225* (2006.01)
*H04N 5/247* (2006.01)

(52) U.S. Cl.
CPC ..... *G02B 27/0176* (2013.01); *G02B 27/0172* (2013.01); *H04N 5/2253* (2013.01);
(Continued)

(58) Field of Classification Search
CPC .... H04N 5/2253; H04N 5/2257; H04N 5/247; G02B 27/0176; G02B 27/0172; G02B 2027/0138; G02B 2027/0178; G02C 11/10
See application file for complete search history.

(56) References Cited

U.S. PATENT DOCUMENTS 4,344,092 A    8/1982  Miller
4,652,930 A    3/1987  Crawford
(Continued)

FOREIGN PATENT DOCUMENTS

CN    101449270 A    6/2009
CN    104040410 A    9/2014
(Continued)

OTHER PUBLICATIONS

"Communication according to Rule 164(1) EPC dated Feb. 23, 2022", European Patent Application No. 20753144.3, (11 pages).
(Continued)

*Primary Examiner* — Lin Ye
*Assistant Examiner* — John H Morehead, III
(74) *Attorney, Agent, or Firm* — Stephen M. De Klerk (57) ABSTRACT

An open cell foam is used to create a seal between a camera and a shell piece. The shell piece, camera, seal and a transparent window form a closed front cavity. Because the cavity is closed, dust can remain away from a lens of the camera.

25 Claims, 6 Drawing Sheets

(52) U.S. Cl.
CPC ........... *H04N 5/2257* (2013.01); *H04N 5/247* (2013.01); *G02B 2027/0138* (2013.01)

(56) References Cited

U.S. PATENT DOCUMENTS

| | | | |
|---|---|---|---|
| 4,810,080 A | 3/1989 | Grendol et al. | |
| 4,997,268 A | 3/1991 | Dauvergne | |
| 5,007,727 A | 4/1991 | Kahaney et al. | |
| 5,074,295 A | 12/1991 | Willis | |
| 5,240,220 A | 8/1993 | Elberbaum | |
| 5,251,635 A | 10/1993 | Dumoulin et al. | |
| 5,410,763 A | 5/1995 | Bolle | |
| 5,455,625 A | 10/1995 | Englander | |
| 5,495,286 A * | 2/1996 | Adair | A61B 1/042 600/109 |
| 5,497,463 A | 3/1996 | Stein et al. | |
| 5,682,255 A | 10/1997 | Friesem et al. | |
| 5,826,092 A | 10/1998 | Flannery | |
| 5,854,872 A | 12/1998 | Tai | |
| 5,864,365 A * | 1/1999 | Sramek | G08B 13/19619 348/E5.026 |
| 5,937,202 A | 8/1999 | Crosetto | |
| 6,012,811 A | 1/2000 | Chao et al. | |
| 6,016,160 A | 1/2000 | Coombs et al. | |
| 6,064,749 A | 5/2000 | Hirota et al. | |
| 6,076,927 A | 6/2000 | Owens | |
| 6,117,923 A | 9/2000 | Amagai et al. | |
| 6,124,977 A | 9/2000 | Takahashi | |
| 6,191,809 B1 | 2/2001 | Hori et al. | |
| 6,375,369 B1 | 4/2002 | Schneider et al. | |
| 6,385,735 B1 | 5/2002 | Wilson | |
| 6,538,655 B1 | 3/2003 | Kubota | |
| 6,541,736 B1 | 4/2003 | Huang et al. | |
| 6,757,068 B2 | 6/2004 | Foxlin | |
| 7,046,515 B1 | 5/2006 | Wyatt | |
| 7,051,219 B2 | 5/2006 | Hwang | |
| 7,076,674 B2 | 7/2006 | Cervantes | |
| 7,111,290 B1 | 9/2006 | Yates, Jr. | |
| 7,119,819 B1 | 10/2006 | Robertson et al. | |
| 7,219,245 B1 | 5/2007 | Raghuvanshi | |
| 7,431,453 B2 | 10/2008 | Hogan | |
| 7,542,040 B2 | 6/2009 | Templeman | |
| 7,573,640 B2 | 8/2009 | Nivon et al. | |
| 7,724,980 B1 | 5/2010 | Shenzhi | |
| 7,751,662 B2 | 7/2010 | Kleemann | |
| 7,758,185 B2 | 7/2010 | Lewis | |
| 8,060,759 B1 | 11/2011 | Arnan et al. | |
| 8,120,851 B2 | 2/2012 | Iwasa | |
| 8,214,660 B2 | 7/2012 | Capps, Jr. | |
| 8,246,408 B2 | 8/2012 | Elliot | |
| 8,353,594 B2 | 1/2013 | Lewis | |
| 8,508,676 B2 | 8/2013 | Silverstein et al. | |
| 8,547,638 B2 | 10/2013 | Levola | |
| 8,605,764 B1 | 10/2013 | Rothaar et al. | |
| 8,619,365 B2 | 12/2013 | Harris et al. | |
| 8,696,113 B2 | 4/2014 | Lewis | |
| 8,698,701 B2 | 4/2014 | Margulis | |
| 8,733,927 B1 | 5/2014 | Lewis | |
| 8,736,636 B2 | 5/2014 | Kang | |
| 8,759,929 B2 | 6/2014 | Shiozawa et al. | |
| 8,793,770 B2 | 7/2014 | Lim | |
| 8,823,855 B2 | 9/2014 | Hwang | |
| 8,847,988 B2 | 9/2014 | Geisner et al. | |
| 8,874,673 B2 | 10/2014 | Kim | |
| 9,010,929 B2 | 4/2015 | Lewis | |
| 9,015,501 B2 | 4/2015 | Gee | |
| 9,086,537 B2 | 7/2015 | Iwasa et al. | |
| 9,095,437 B2 | 8/2015 | Boyden et al. | |
| 9,239,473 B2 | 1/2016 | Lewis | |
| 9,244,293 B2 | 1/2016 | Lewis | |
| 9,244,533 B2 | 1/2016 | Friend et al. | |
| 9,383,823 B2 | 7/2016 | Geisner et al. | |
| 9,489,027 B1 | 11/2016 | Ogletree | |
| 9,519,305 B2 | 12/2016 | Wolfe | |
| 9,581,820 B2 | 2/2017 | Robbins | |
| 9,582,060 B2 | 2/2017 | Balatsos | |
| 9,658,473 B2 | 5/2017 | Lewis | |
| 9,671,566 B2 | 6/2017 | Abovitz et al. | |
| 9,671,615 B1 | 6/2017 | Vallius et al. | |
| 9,696,795 B2 | 7/2017 | Marcolina et al. | |
| 9,798,144 B2 | 10/2017 | Sako et al. | |
| 9,874,664 B2 | 1/2018 | Stevens et al. | |
| 9,880,441 B1 * | 1/2018 | Osterhout | G02B 27/017 |
| 9,918,058 B2 | 3/2018 | Takahas et al. | |
| 9,955,862 B2 | 5/2018 | Freeman et al. | |
| 9,978,118 B1 | 5/2018 | Ozgumer et al. | |
| 9,996,797 B1 | 6/2018 | Holz et al. | |
| 10,018,844 B2 | 7/2018 | Levola et al. | |
| 10,082,865 B1 | 9/2018 | Raynal et al. | |
| 10,151,937 B2 | 12/2018 | Lewis | |
| 10,185,147 B2 | 1/2019 | Lewis | |
| 10,218,679 B1 | 2/2019 | Jawahar | |
| 10,241,545 B1 | 3/2019 | Richards et al. | |
| 10,317,680 B1 | 6/2019 | Richards et al. | |
| 10,436,594 B2 | 10/2019 | Belt et al. | |
| 10,516,853 B1 | 12/2019 | Gibson et al. | |
| 10,551,879 B1 | 2/2020 | Richards et al. | |
| 10,578,870 B2 | 3/2020 | Kimmel | |
| 10,698,202 B2 | 6/2020 | Kimmel et al. | |
| 10,856,107 B2 | 10/2020 | Mycek et al. | |
| 10,825,424 B2 | 11/2020 | Zhang | |
| 10,987,176 B2 | 4/2021 | Poltaretskyi et al. | |
| 11,190,681 B1 | 11/2021 | Brook et al. | |
| 11,209,656 B1 | 12/2021 | Choi et al. | |
| 11,236,993 B1 | 2/2022 | Hall et al. | |
| 2001/0010598 A1 | 8/2001 | Aritake et al. | |
| 2002/0007463 A1 | 1/2002 | Fung | |
| 2002/0108064 A1 | 2/2002 | Nunally | |
| 2002/0063913 A1 | 5/2002 | Nakamura et al. | |
| 2002/0071050 A1 | 6/2002 | Homberg | |
| 2002/0122648 A1 | 9/2002 | Mule' et al. | |
| 2002/0140848 A1 | 10/2002 | Cooper et al. | |
| 2003/0028816 A1 | 2/2003 | Bacon | |
| 2003/0048456 A1 | 3/2003 | Hill | |
| 2003/0067685 A1 | 4/2003 | Niv | |
| 2003/0077458 A1 | 4/2003 | Korenaga et al. | |
| 2003/0115494 A1 | 6/2003 | Cervantes | |
| 2003/0218614 A1 | 11/2003 | Lavelle et al. | |
| 2003/0219992 A1 | 11/2003 | Schaper | |
| 2003/0226047 A1 | 12/2003 | Park | |
| 2004/0001533 A1 | 1/2004 | Tran et al. | |
| 2004/0021600 A1 | 2/2004 | Wittenberg | |
| 2004/0025069 A1 | 2/2004 | Gary et al. | |
| 2004/0042377 A1 | 3/2004 | Nikoloai et al. | |
| 2004/0073822 A1 | 4/2004 | Greco | |
| 2004/0073825 A1 | 4/2004 | Itoh | |
| 2004/0111248 A1 | 6/2004 | Granny et al. | |
| 2004/0174496 A1 | 9/2004 | Ji et al. | |
| 2004/0186902 A1 | 9/2004 | Stewart | |
| 2004/0201857 A1 | 10/2004 | Foxlin | |
| 2004/0238732 A1 | 12/2004 | State et al. | |
| 2004/0240072 A1 | 12/2004 | Schindler et al. | |
| 2004/0246391 A1 | 12/2004 | Travis | |
| 2004/0268159 A1 | 12/2004 | Aasheim et al. | |
| 2005/0001977 A1 | 1/2005 | Zelman | |
| 2005/0034002 A1 | 2/2005 | Flautner | |
| 2005/0157159 A1 | 7/2005 | Komiya et al. | |
| 2005/0177385 A1 | 8/2005 | Hull | |
| 2005/0273792 A1 | 12/2005 | Inohara et al. | |
| 2006/0013435 A1 | 1/2006 | Rhoads | |
| 2006/0015821 A1 | 1/2006 | Jacques Parker et al. | |
| 2006/0019723 A1 | 1/2006 | Vorenkamp | |
| 2006/0038880 A1 | 2/2006 | Starkweather et al. | |
| 2006/0050224 A1 | 3/2006 | Smith | |
| 2006/0090092 A1 | 4/2006 | Verhulst | |
| 2006/0126181 A1 | 6/2006 | Levola | |
| 2006/0129852 A1 | 6/2006 | Bonola | |
| 2006/0132914 A1 | 6/2006 | Weiss et al. | |
| 2006/0179329 A1 | 8/2006 | Terechko | |
| 2006/0221448 A1 | 10/2006 | Nivon et al. | |
| 2006/0228073 A1 | 10/2006 | Mukawa et al. | |
| 2006/0250322 A1 | 11/2006 | Hall et al. | |
| 2006/0259621 A1 | 11/2006 | Ranganathan | |
| 2006/0268220 A1 | 11/2006 | Hogan | |

(56) References Cited

U.S. PATENT DOCUMENTS

| | | |
|---|---|---|
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirielli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0173036 A1 | 7/2008 | Williams |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0153934 A1 | 6/2010 | Lachner |
| 2010/0194632 A1 | 8/2010 | Raento et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0296163 A1 | 11/2010 | Sarikko |
| 2011/0021263 A1 | 1/2011 | Anderson et al. |
| 2011/0022870 A1 | 1/2011 | Mcgrane |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1* | 9/2014 | Magyari ............ G02B 17/0642 345/8 |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0033770 A1 | 2/2016 | Fujimaki et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0187654 A1* | 6/2016 | Border ............... G02B 27/0172 359/630 |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |

(56) References Cited

U.S. PATENT DOCUMENTS

| | | |
|---|---|---|
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1* | 8/2017 | Kamakura ......... G02B 27/0006 345/8 |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1* | 2/2018 | Jones, Jr. ............... G02B 6/005 |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirier et al. |
| 2018/0136466 A1 | 5/2018 | Ko |
| 2018/0144691 A1 | 5/2018 | Choi et al. |
| 2018/0151796 A1 | 5/2018 | Akahane |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0218545 A1 | 8/2018 | Garcia et al. |
| 2018/0250589 A1 | 9/2018 | Cossairt et al. |
| 2018/0284877 A1 | 10/2018 | Klein |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0137788 A1 | 5/2019 | Suen |
| 2019/0155439 A1 | 5/2019 | Mukherjee et al. |
| 2019/0158926 A1 | 5/2019 | Kang et al. |
| 2019/0167095 A1 | 6/2019 | Krueger |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0219815 A1 | 7/2019 | Price et al. |
| 2019/0243123 A1 | 8/2019 | Bohn |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2020/0066045 A1 | 2/2020 | Stahl et al. |
| 2020/0098188 A1 | 3/2020 | Bar-Zeev et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0142582 A1 | 5/2021 | Jones et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |

FOREIGN PATENT DOCUMENTS

| | | |
|---|---|---|
| CN | 104603675 A | 5/2015 |
| CN | 106662754 A | 5/2017 |
| CN | 107683497 A1 | 2/2018 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2011-033993 A | 2/2011 |
| JP | 2012-015774 A | 1/2012 |
| JP | 2013-525872 A1 | 6/2013 |
| JP | 2015-191032 A | 11/2015 |
| JP | 2016-502120 A | 1/2016 |

(56) References Cited

FOREIGN PATENT DOCUMENTS

| | | |
|---|---|---|
| JP | 2016-85463 A | 5/2016 |
| JP | 2016-516227 A | 6/2016 |
| JP | 2017-531840 A | 10/2017 |
| JP | 6232763 B2 | 11/2017 |
| JP | 6333965 B2 | 5/2018 |
| KR | 2005-0010775 A | 1/2005 |
| KR | 10-1372623 B1 | 3/2014 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2012030787 A2 | 3/2012 |
| WO | 2013/049012 A1 | 4/2013 |
| WO | 2013062701 A1 | 5/2013 |
| WO | 2014033306 A1 | 3/2014 |
| WO | 2015143641 A1 | 10/2015 |
| WO | 2016/054092 A1 | 4/2016 |
| WO | 2017004695 A1 | 1/2017 |
| WO | 2017044761 A1 | 3/2017 |
| WO | 2017120475 A1 | 7/2017 |
| WO | 2017176861 A1 | 10/2017 |
| WO | 2017/203201 A1 | 11/2017 |
| WO | 2018/044537 A1 | 3/2018 |
| WO | 2018087408 A1 | 5/2018 |
| WO | 2018097831 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

"Communication Pursuant to Article 94(3) EPC dated Apr. 25, 2022", European Patent Application No. 18885707.2, (5 pages).
"Communication Pursuant to Article 94(3) EPC dated May 30, 2022", European Patent Application No. 19768418.6, (6 pages).
"Extended European Search Report dated Jan. 28, 2022", European Patent Application No. 19815876.8, (9 pages).
"Extended European Search Report dated Jun. 19, 2020", European Patent Application No. 20154750.2, (10 pages).
"Extended European Search Report dated Mar. 22, 2022", European Patent Application No. 19843487.0, (14 pages).
"Extended European Search Report dated May 16, 2022", European Patent Application No. 19871001.4, (9 pages).
"Extended European Search Report dated May 30, 2022", European Patent Application No. 20753144.3, (10 pages).
"Final Office Action dated Feb. 23, 2022", U.S. Appl. No. 16/748,193, (23 pages).
"Final Office Action dated Feb. 3, 2022", U.S. Appl. No. 16/864,721, (36 pages).
"Final Office Action dated Jul. 13, 2022", U.S. Appl. No. 17/262,991, (18 pages).
"First Examination Report dated May 13, 2022", Indian Patent Application No. 202047026359, (8 pages).
"First Office Action dated Mar. 14, 2022 with English translation", Chinese Patent Application No. 201880079474.6, (11 pages).
"Non Final Office Action dated Apr. 1, 2022", U.S. Appl. No. 17/256,961, (65 pages).
"Non Final Office Action dated Apr. 11, 2022", U.S. Appl. No. 16/938,782, (52 pages).
"Non Final Office Action dated Apr. 12, 2022", U.S. Appl. No. 17/262,991, (60 pages).
"Non Final Office Action dated Feb. 2, 2022", U.S. Appl. No. 16/783,866, (8 pages).
"Non Final Office Action dated Mar. 31, 2022", U.S. Appl. No. 17/257,814, (60 pages).
"Non Final Office Action dated Mar. 9, 2022", U.S. Appl. No. 16/870,676, (57 pages).
"Non Final Office Action dated May 10, 2022", U.S. Appl. No. 17/140,921, (25 pages).
"Non Final Office Action dated May 17, 2022", U.S. Appl. No. 16/748,193, (11 pages).
Communication Pursuant to Article 94(3) EPC dated Jan. 4, 2022, European Patent Application No. 20154070.5, (8 pages).
Communication Pursuant to Article 94(3) EPC dated Oct. 21, 2021, European Patent Application No. 16207441.3, (4 pages).
Communication Pursuant to Rule 164(1) EPC dated Jul. 27, 2021, European Patent Application No. 19833664.6, (11 pages).
Extended European Search Report dated Jun. 30, 2021, European Patent Application No. 19811971.1, (9 pages).
Extended European Search Report dated Jan. 4, 2022, European Patent Application No. 19815085.6, (9 pages).
Extended European Search Report dated Jul. 16, 2021, European Patent Application No. 19810142.0, (14 pages).
Extended European Search Report dated Jul. 30, 2021, European Patent Application No. 19839970.1, (7 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Sep. 17, 2021, U.S. Appl. No. 16/938,782, (44 pages).
"multi-core processor", TechTarget , 2013 , (1 page).
Non Final Office Action dated Aug. 4, 2021, U.S. Appl. No. 16/864,721, (51 pages).
Non Final Office Action dated Jul. 9, 2021, U.S. Appl. No. 16/833,093, (47 pages).
Non Final Office Action dated Jun. 29, 2021, U.S. Appl. No. 16/698,588, (58 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).
Giuseppe, Donato , et al. , "Stereoscopic helmet mounted system for real time 3D environment reconstruction and indoor ego-motion estimation", Proc. SPIE 6955, Head- and Helmet-Mounted Displays XIII: Design and Applications, 69550P.
Mrad, et al., "A framework for System Level Low Power Design Space Exploration", 1991.
Sheng, Liu, et al., "Time-multiplexed dual-focal plane head-mounted display with a liquid lens" , Optics Letters, Optical Society of America, US, vol. 34, No. 11, Jun. 1, 2009 (Jun. 1, 2009), XP001524475, ISSN: 0146-9592, pp. 1642-1644.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Article 94(3) EPC dated Sep. 4, 2019, European Patent Application No. 10793707.0, (4 pages).
European Search Report dated Oct. 15, 2020, European Patent Application No. 20180623.9, (10 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Mar. 4, 2021, European Patent Application No. 19768418.6, (9 pages).
Extended European Search Report dated Nov. 4, 2020, European Patent Application No. 20190980.1, (14 pages).
Extended European Search Report dated Jun. 12, 2017, European Patent Application No. 16207441.3, (8 pages).

(56) References Cited

OTHER PUBLICATIONS

Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
Final Office Action dated Jun. 15, 2021, U.S. Appl. No. 16/928,313, (42 pages).
Final Office Action dated Mar. 1, 2021, U.S. Appl. No. 16/214,575, (29 pages).
Final Office Action dated Mar. 19, 2021, U.S. Appl. No. 16/530,776, (25 pages).
Final Office Action dated Nov. 24, 2020, U.S. Appl. No. 16/435,933, (44 pages).
International Search Report and Written Opinion dated Feb. 12, 2021, International Application No. PCT/US20/60555, (25 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Feb. 2, 2021, International PCT Patent Application No. PCT/US20/60550, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Dec. 3, 2020, International Patent Application No. PCT/US20/43596, (25 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Jul. 27, 2020, U.S. Appl. No. 16/435,933, (16 pages).
Non Final Office Action dated Jul. 9, 2021, U.S. Appl. No. 17/002,663, (43 pages).
Non Final Office Action dated Jun. 10, 2021, U.S. Appl. No. 16/938,782, (40 Pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Mar. 3, 2021, U.S. Appl. No. 16/427,337, (41 pages).
Non Final Office Action dated May 26, 2021, U.S. Appl. No. 16/214,575, (19 pages).
Non Final Office Action dated Nov. 19, 2019, U.S. Appl. No. 16/355,611, (31 pages).
Non Final Office Action dated Nov. 5, 2020, U.S. Appl. No. 16/530,776, (45 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
"Phototourism Challenge", CVPR 2019 Image Matching Workshop. https://image matching-workshop. github.io., (16 pages).
Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/50040-6090(97)00135-1; see entire document, (2 pages).

(56) References Cited

OTHER PUBLICATIONS

Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.

Arandjelović, Relja et al., "Three things everyone should know to improve object retrieval", CVPR, 2012, (8 pages).

Azom, , "Silica-Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>, (6 pages).

Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).

Azuma, Ronald T., "Predictive Tracking for Augmented Reality", Department of Computer Science, Chapel Hill NC; TR95-007, Feb. 1995, 262 pages.

Battaglia, Peter W. et al., "Relational inductive biases, deep learning, and graph networks", arXiv:1806.01261, Oct. 17, 2018, pp. 1-40.

Berg, Alexander C et al., "Shape matching and object recognition using low distortion correspondences", In CVPR, 2005, (8 pages).

Bian, Jiawang et al., "GMS: Grid-based motion statistics for fast, ultra-robust feature correspondence.", In CVPR (Conference on Computer Vision and Pattern Recognition), 2017, (10 pages).

Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).

Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).

Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).

Caetano, Tibério S et al., "Learning graph matching", IEEE TPAMI, 31(6):1048-1058, 2009.

Cech, Jan et al., "Efficient sequential correspondence selection by cosegmentation", IEEE TPAMI, 32(9):1568-1581, Sep. 2010.

Cuturi, Marco, "Sinkhorn distances: Lightspeed computation of optimal transport", NIPS, 2013, (9 pages).

Dai, Angela et al., "ScanNet: Richly-annotated 3d reconstructions of indoor scenes", In CVPR, arXiv:1702.04405v2 [cs.CV] Apr. 11, 2017, (22 pages).

Deng, Haowen et al., "PPFnet: Global context aware local features for robust 3d point matching", In CVPR, arXiv:1802.02669v2 [cs.CV] Mar. 1, 2018, (12 pages).

Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).

Detone, Daniel et al., "Self-improving visual odometry", arXiv:1812.03245, Dec. 8, 2018, (9 pages).

Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).

Dusmanu, Mihai et al., "D2-net: A trainable CNN for joint detection and description of local features", CVPR, arXiv:1905.03561v1 [cs.CV] May 9, 2019, (16 pages).

Ebel, Patrick et al., "Beyond cartesian representations for local descriptors", ICCV, arXiv:1908.05547v1 [cs.CV] Aug. 15, 2019, (11 pages).

Fischler, Martin A et al., "Random sample consensus: a paradigm for model fitting with applications to image analysis and automated cartography", Communications of the ACM, 24(6): 1981, pp. 381-395.

Gilmer, Justin et al., "Neural message passing for quantum chemistry", In ICML, arXiv:1704.01212v2 [cs.LG] Jun. 12, 2017, (14 pages).

Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>, (9 pages).

Hartley, Richard et al., "Multiple View Geometry in Computer Vision", Cambridge University Press, 2003, pp. 1-673.

Jacob, Robert J. , "Eye Tracking in Advanced Interface Design", Human-Computer Interaction Lab, Naval Research Laboratory, Washington, D.C., date unknown. 2003, pp. 1-50.

Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082>, entire document.

Lee, Juho et al., "Set transformer: A frame-work for attention-based permutation-invariant neural networks", ICML, arXiv:1810.00825v3 [cs.LG] May 26, 2019, (17 pages).

Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).

Levola, T., "Diffractive Optics for Virtual Reality Displays", Journal of the SID EURODISPLAY 14/05, 2005, XP008093627, chapters 2-3, Figures 2 and 10, pp. 467-475.

Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.

Li, Yujia et al., "Graph matching networks for learning the similarity of graph structured objects", ICML, arXiv:1904.12787v2 [cs.LG] May 12, 2019, (18 pages).

Li, Zhengqi et al., "Megadepth: Learning single-view depth prediction from internet photos", In CVPR, fromarXiv: 1804.00607v4 [cs.CV] Nov. 28, 2018, (10 pages).

Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.

Loiola, Eliane M. et al., "A survey for the quadratic assignment problem", European journal of operational research, 176(2): 2007, pp. 657-690.

Lowe, David G., "Distinctive image features from scale-invariant keypoints", International Journal of Computer Vision, 60(2): 91-110, 2004, (28 pages).

Luo, Zixin et al., "ContextDesc: Local descriptor augmentation with cross-modality context", CVPR, arXiv:1904.04084v1 [cs.CV] Apr. 8, 2019, (14 pages).

Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).

Molchanov, Pavlo et al., "Short-range FMCW monopulse radar for hand-gesture sensing", 2015 IEEE Radar Conference (RadarCon) (2015), pp. 1491-1496.

Munkres, James , "Algorithms for the assignment and transportation problems", Journal of the Society for Industrial and Applied Mathematics, 5(1): 1957, pp. 32-38.

Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).

(56) References Cited

OTHER PUBLICATIONS

Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763>, entire document.
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http://fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10, 1016/j.polymdegradstab.2010, 12.003, (17 pages).
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908.04964v1 [cs.CV] Aug. 14, 2019, (11 pages).
Zhang, Li et al., "Dual graph convolutional net-work for semantic segmentation", BMVC, 2019; arXiv:1909.06121v3 [cs.CV] Aug. 26, 2020, (18 pages).
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"First Office Action dated Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Jul. 26, 2022", U.S. Appl. No. 17/098,059, (28 pages).
"Second Office Action dated Jul. 13, 2022 with English Translation", Chinese Patent Application No. 201880079474.6, (10 pages).
"Second Office Action dated Jun. 20, 2022 with English Translation", Chinese Patent Application No. 201880089255.6, (14 pages).
Anonymous , "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C. , et al., "Single filters for combined image geometric manipulation and enhancement", Proceedings of SPIE vol. 1903, Image and Video Processing, Apr. 8, 1993, San Jose, CA. (Year: 1993), pp. 111-121.

(56) References Cited

OTHER PUBLICATIONS

"Extended European Search Report dated Nov. 3, 2022", European Patent Application No. 20770244.0, (23 pages).
"Non Final Office Action dated Dec. 7, 2022", U.S. Appl. No. 17/357,795, (63 pages).
"Notice of Reason for Rejection dated Oct. 28, 2022 with English translation", Japanese Patent Application No. 2020-531452, (3 pages).
"Office Action dated Nov. 24, 2022 with English Translation", Japanese Patent Application No. 2020-533730, 11 pages).
"Extended European Search Report dated Dec. 14, 2022", European Patent Application No. 20886547.7, (8 pages).
"Final Office Action dated Dec. 29, 2022", U.S. Appl. No. 17/098,059, (32 pages).
"Non Final Office Action dated Jan. 24, 2023", U.S. Appl. No. 17/497,940, (10 pages).
"First Office Action dated Jan. 24, 2023 with English translation", Japanese Patent Application No. 2020-549034, (7 pages).
"Non Final Office Action dated Feb. 3, 2023", U.S. Appl. No. 17/429,100, (16 pages).
"Non Final Office Action dated Feb. 3, 2023", U.S. Appl. No. 17/497,965, (32 pages).

\* cited by examiner

VIEWING DEVICE WITH DUST SEAL INTEGRATION

CROSS-REFERENCE TO RELATED APPLICATIONS

This application is a National Phase of International Application No. PCT/US2019/043097, filed on Jul. 23, 2019, which claims priority from U.S. Provisional Patent Application No. 62/702,731, filed on Jul. 24, 2018, all of which are incorporated herein by reference in their entirety.

BACKGROUND OF THE INVENTION

1). Field of the Invention

This invention relates generally to a viewing device and more specifically to a method of forming and assembling a dust seal in a viewing device.

2). Discussion of Related Art

Modern computing and display technologies have facilitated development of visual perception devices such as "virtual reality" viewing devices. A virtual reality viewing device may be a wearable device that presents the user with two images, one for the left eye and one for the right eye. Objects in the images may differ from one another in a manner that allows the brain to process the objects as a three-dimensional object. When the images constantly change, movement in three-dimensions can be simulated. A virtual reality viewing device typically involves presentation of digital or virtual image information without transparency to other real-world objects.

Other visual perception devices, so called "augmented reality" viewing devices usually include technology that allows for the presentation of digital and virtual image information as an augmentation to visualization of the actual world around the user. An augmented reality viewing device may, for example, have one or more transparent eyepieces that allow the user to see real world objects behind the eyepieces. Such an eyepiece can serve as a wave guide through which light propagates from a projector towards an eye of the user. A light pattern created by the projector becomes visible on the retina of the eye. The retina of the eye then receives light from the real-world objects behind the eyepiece and light from the projector. Real world objects are thus augmented with image data from the projector, in the perception of the user.

Augmented reality devices often have technology that permit for an object to remain in a stationary position relative to real world objects, as perceived by the user, even if the user would move their head. If the user would, for example, rotate their head to the right, the rendered object has to rotate to the left within the view of the user together with real world objects. Movement of the augmented reality device may be tracked through a visual system that includes one or more cameras and depth sensors in combination with a measurement device such as an inertial measurement unit (IMU) so that the position of the object can be adjusted via the projector.

SUMMARY OF THE INVENTION

The invention provides a viewing device including a shell piece defining a first window opening, an internal mounting structure secured to the shell piece, a first camera assembly including, a transparent window mounted to the shell piece over the window first opening, the transparent window having a periphery that makes continuous contact with the shell piece, a camera having a lens, the camera being mounted to the internal mounting structure with a gap defined between the lens and the window and a seal having a first external surface contacting the shell piece and a second external surface contacting the camera so that a closed front cavity is defined jointly by the window, the lens and the seal.

The invention also provides a method of constructing a viewing device including mounting a transparent window to the shell piece over the window opening defined by the shell piece, the window having a periphery that makes continuous contact with the shell piece, mounting a camera to the internal mounting structure, locating a seal between the shell piece and the internal mounting structure and securing the internal mounting structure to the shell piece with a gap defined between a lens of the camera and the window and with the seal having a first external surface contacting the shell piece and a second external surface contacting the camera so that a closed front cavity is defined jointly by the window, the lens and the seal.

BRIEF DESCRIPTION OF THE DRAWINGS

The invention is further described by way of example with reference to the accompanying drawings, wherein.

DETAILED DESCRIPTION OF THE INVENTION

Figure 1:
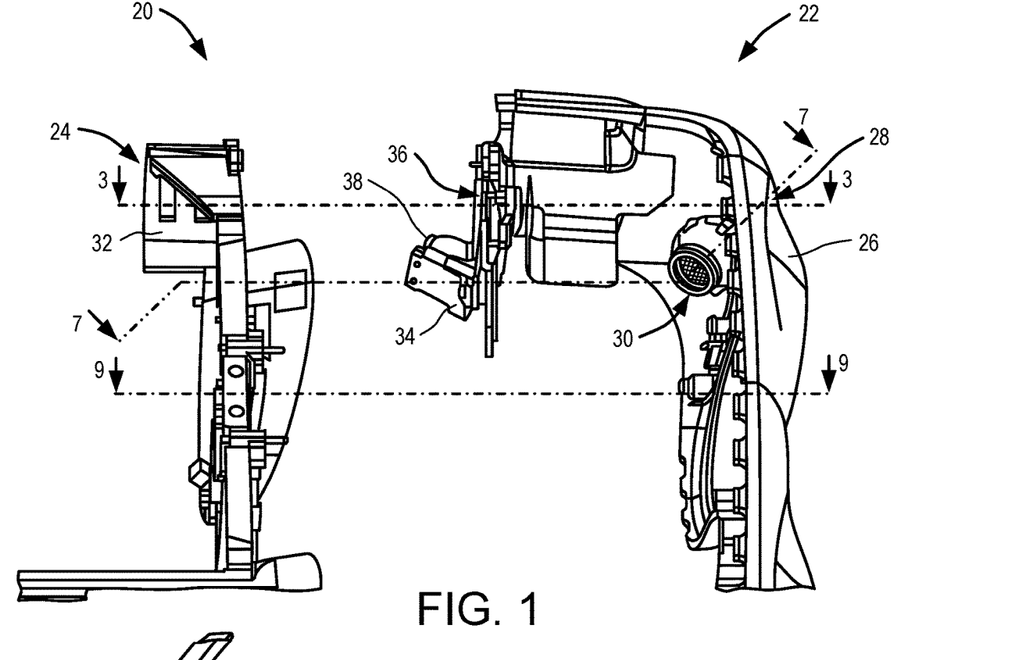
FIG. 1 is a perspective view of a viewing device, according to an embodiment of the invention with an internal mounting structure and a shell piece shown in a space relationship relative to one another.

FIG. 1 of the accompanying drawings illustrates a viewing device 20, according to an embodiment of the invention, including first and second main sub-assemblies 22 and 24 in a spaced relationship relative to one another and before being finally assembled.

The first main sub-assembly 22 includes a shell piece 26 and first and second shell-side camera sub-assemblies 28 and 30.

The second main sub-assembly 24 includes an internal mounting structure 32, a camera electronics board 34 and first and second mounting structure-side camera sub-assemblies 36 and 38. The first and second mounting structure-side camera sub-assemblies 36 and 38 are secured to the camera electronics board 34. The camera electronics board 34 is then secured to the internal mounting structure 32.

Figure 2:
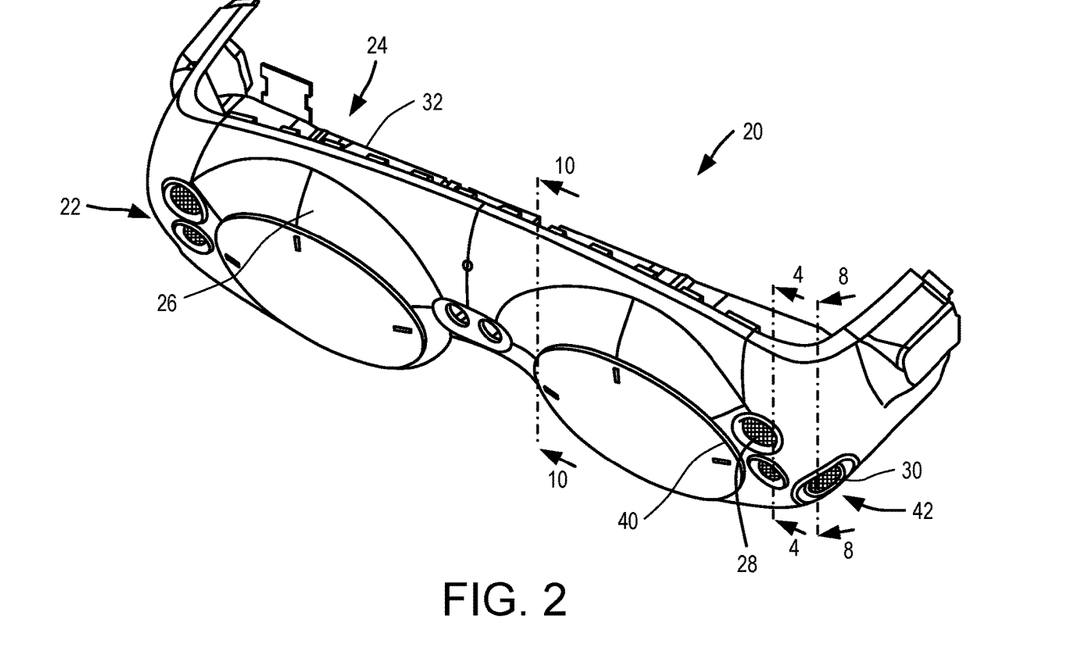
FIG. 2 is perspective view of the viewing device with the internal mounting structure and the shell piece in an assembled relationship.

FIG. 2 illustrates the viewing device 20 after the first and second main sub-assemblies 22 and 24 are secured to one another. The shell piece 26 and the internal mounting structure 32 are moved from the spaced relationship in FIG. 1 to an assembled relationship in FIG. 2 relatively towards one another. In the assembled relationship of FIG. 2, the first shell-side camera sub-assembly 28 and the first mounting structure-side camera sub-assembly 36 come together to form a first camera assembly 40. In the assembled relationship, the second shell-side camera sub-assembly 30 and the second mounting structure-side camera sub-assembly 38 come together to form a second camera assembly 42.

Figure 3:
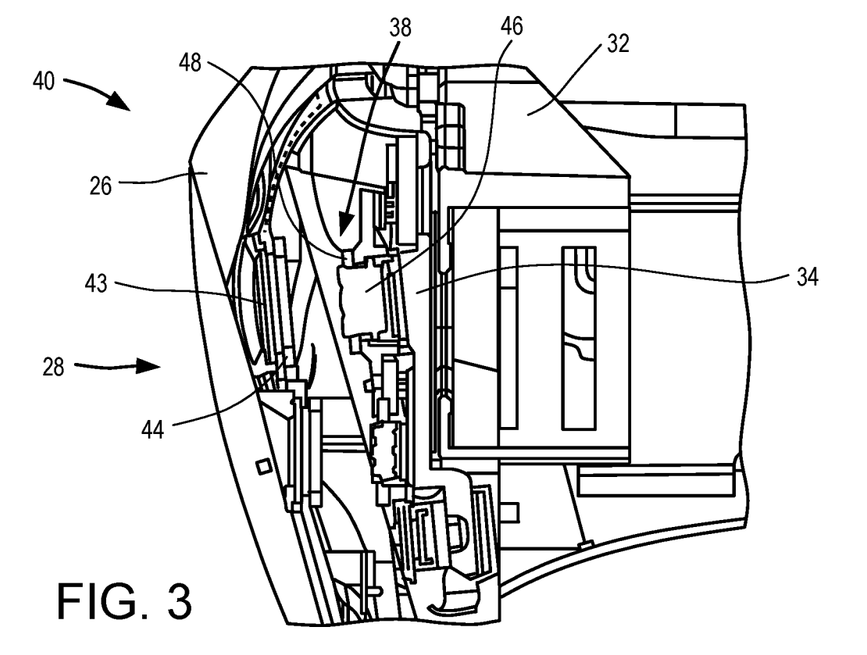
FIG. 3 is a cross-sectional side view on 3-3 in FIG. 1.

FIG. 3 is cross-section on 3-3 in FIG. 1. The first shell-side camera sub-assembly 28 includes a transparent window 43 and first seal member 44. The transparent window 43 and the first seal member 44 are attached to the shell piece 26. The first mounting structure-side camera sub-assembly 36 includes a camera 46 and a second seal member 48. The camera 46 and the second seal member 48 are secured to the camera electronics board 34 and the camera electronics board 34 is secured to the internal mounting structure 32.

The shell piece 26 and the internal mounting structure 32 are shown in the spaced relationship described with reference to FIG. 1. In the spaced relationship, the first and second seal members 44 and 48 are spaced from one another and therefore do not make contact with one another.

Figure 4:
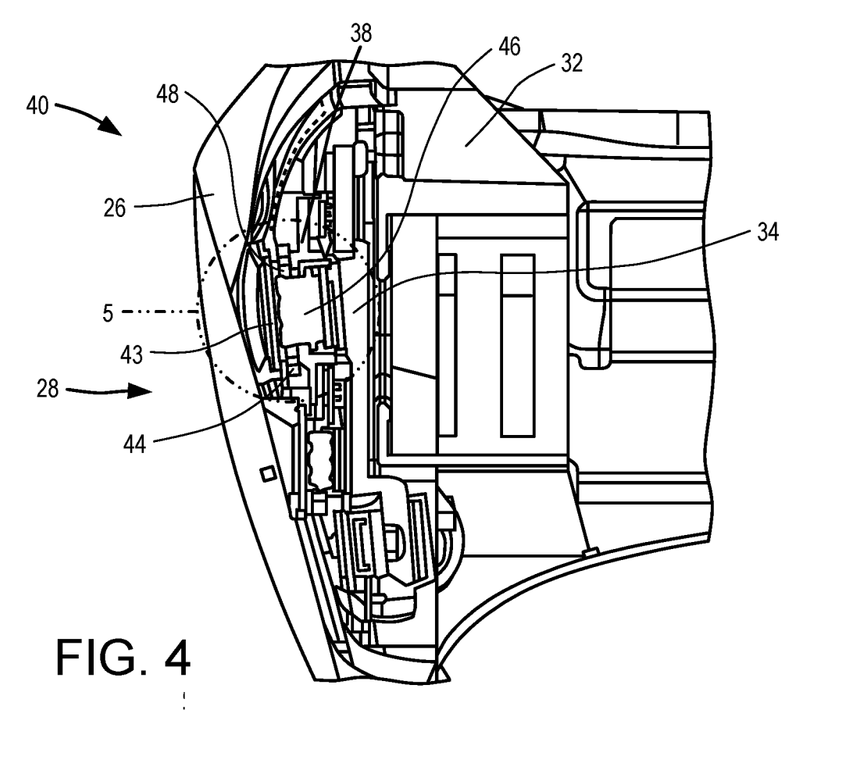
FIG. 4 is a cross-sectional side view on 4-4 in FIG. 2.
Figure 5:
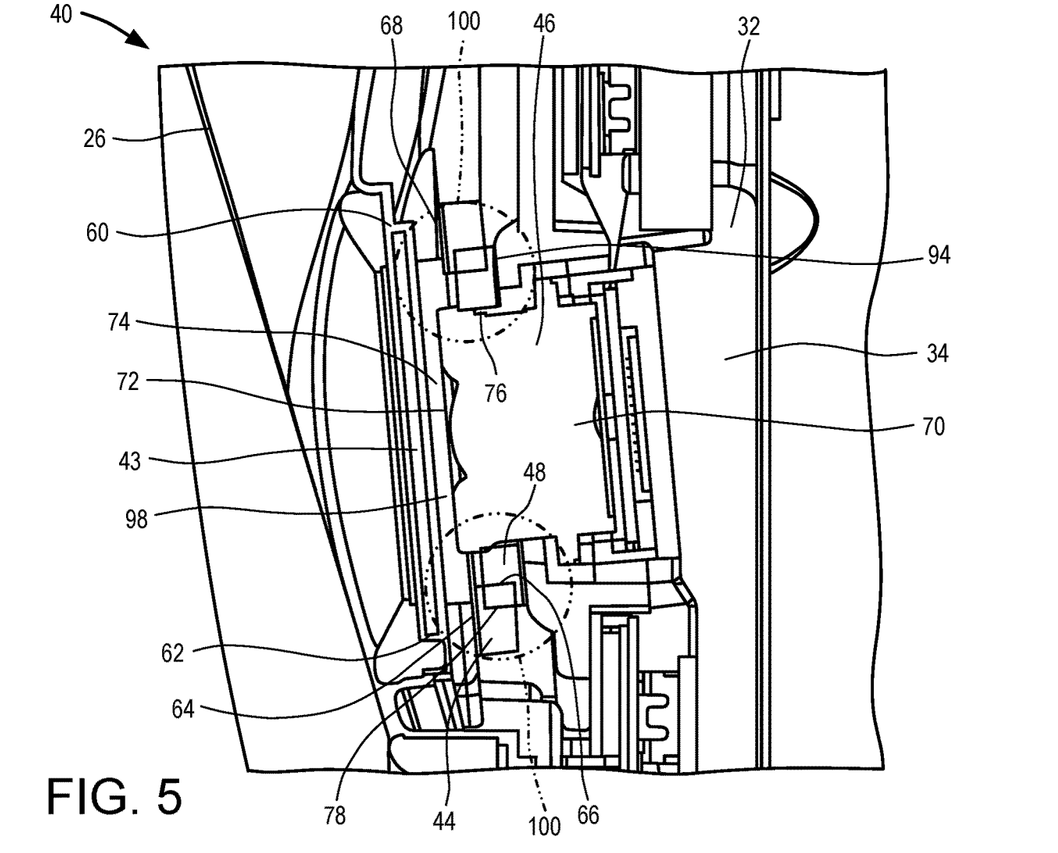
FIG. 5 is an enlarged view of detail "5" in FIG. 4.

FIG. 4 is a cross-section on 4-4 in FIG. 2 and FIG. 5 is an enlarged view of a detail marked "5" in FIG. 4. The shell piece 26 defines a first window opening 60. The first window opening 60 is circular in a plane normal to the paper. The transparent window 43 is attached to the shell piece 26 over the first window opening 60. The transparent window 43 has a circular periphery 62 that makes continuous contact with the window opening 60. Continuous contact between the circular periphery 62 and the first window opening 60 ensures that dust particles cannot enter from left to right past the circular periphery 62.

The first seal member 44 is an annular member that has a first external surface 64 and first engagement surface 66. An adhesive 68 is located between and secures the first external surface 64 to the shell piece 26. The adhesive 68 forms a continuous annular ring that seals continuously with the shell piece 26. A continuous annular seal between the shell piece 26 and the first external surface 64 ensures that dust particles cannot enter through any gap between the shell piece 26 and the first seal member 44.

The camera 46 has a camera body 70 and a lens 72 on the camera body 70. The camera body 70 is mounted to the camera electronics board 34. A gap 74 is defined between the transparent window 43 and the lens 72.

Figure 6:
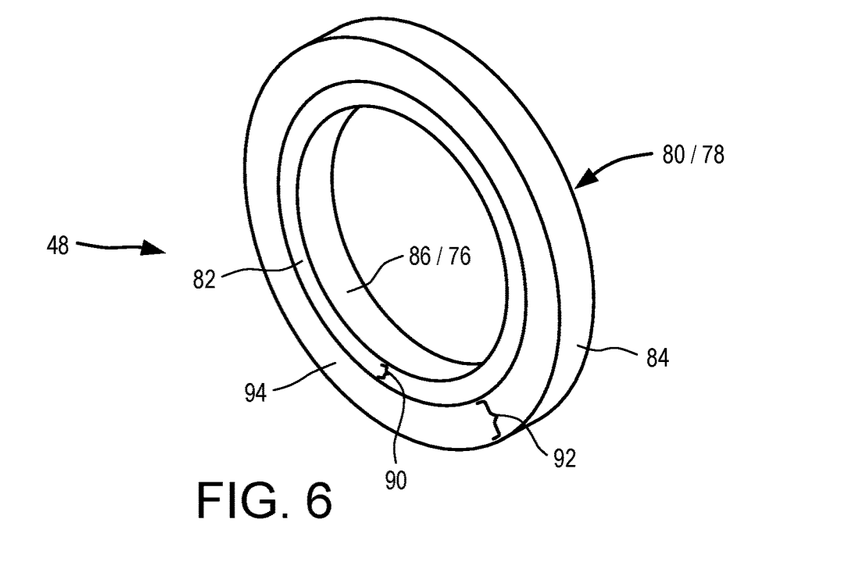
FIG. 6 is perspective view of seal member that is used in FIG. 5.

The second seal member 48 has an annular shape and has a second external surface 76 and second engagement surface 78. FIG. 6 illustrates the second seal member 48 in more detail. The second seal member 48 has a front face 80, a rear face 82, an outer surface 84 and an inner surface 86. The inner and outer surfaces 86 and 84 are circular cylindrical surfaces. The inner surface 86 forms the second internal surface 76 in FIG. 5. The front face 80 forms the second engagement surface 78 in FIG. 5T the rear face 82 is divided into an inner annulus 90 and an outer annulus 92 with the outer annulus 92 surrounding the inner annulus 90. An adhesive 94 can be located on the outer annulus 92, but not on the inner annulus 90, such that adhesive is only located on areas of the second seal member 48 where it will interface with the camera electronics board 34. The adhesive 94 makes continuous contact with the outer annulus 92 through an entire circular revolution.

Referring again to FIG. 5, the adhesive is used to secure the second seal member 48 to the camera electronics board 34. The adhesive 94 creates a circumferential seal between the second seal member 48 and the camera electronics board 34. By forming the adhesive only on the outer annulus 92, the adhesive remains distant from the camera body 70 to ensure that the adhesive does not inadvertently pull on the camera body 70.

The camera body 70 has a circular shape. The second external surface 76 is located around an external surface of the camera body 70. The second external surface 76 forms a seal around the camera body 70. The second external surface 76 is slightly smaller than the external surface of the camera body 70 so that the second external surface 76 is slightly deformed by the shape of the camera body 70. Continuous circumferential contact between the second external surface 76 and the camera body 70 ensures that no dust particles can travel from right to left between the camera body 70 and the second seal member 48.

When the shell piece 26 and the internal mounting structure 32 are moved from the spaced relationship towards the assembled relationship relatively towards one another, the first engagement surface 66 makes contact with the second engagement surface 78. Further movement of the shell piece 26 and the internal mounting structure 32 into the assembled relationship causes the first and second seal members 44 and 48 to deform each other. The first engagement surface 66 is depressed into the first seal member 44 and the second engagement surface 78 is depressed into the second seal member 48.

The first and second engagement surfaces 66 and 78 make continuous contact through an entire annulus around the camera body 70. Such continuous contact between the first and second engagement surfaces 66 and 78 completes the formation of a closed front cavity 98. The closed front cavity 98 is defined jointly by the transparent window 43, the shell piece 26, a portion of the camera 46 that includes the camera body 70 and lens 72, and a seal 100 that is formed by the first and second seal members 44 and 48 between the camera 46 and the shell piece 26. The closed front cavity 98 provides a space between the lens 72 and the transparent window 43 that will remain free of dust particles due to the seal 100 that is provided between the shell piece 26 and the camera 46 and because the transparent window 43 has a circular periphery 62 that seals circumferentially with the first window opening 60 in the shell piece 26.

Figure 7:
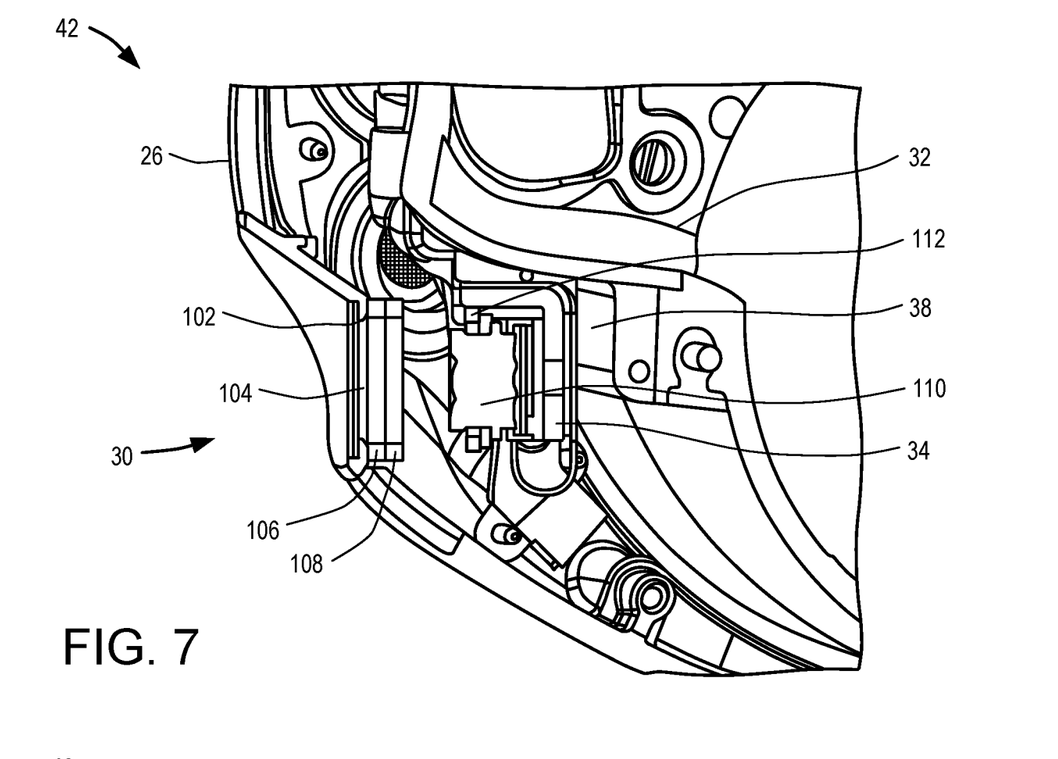
FIG. 7 is a cross-sectional side view on 7-7 in FIG. 1.

FIG. 7 is a cross-section on 7-7 in FIG. 1. The shell piece 26 defines a second window opening 102. The second shell-side camera side assembly 30 includes a transparent window 104 and first and second seal members 106 and 108. The transparent window 104 is secured over the window opening 102 in the same manner as the transparent window 43 and the first window opening 60 in FIG. 5. The first seal member 106 is secured to the shell piece 26 using an adhesive and the second seal member 108 is secured to the first seal member 106 in a similar manner using an adhesive.

The second mounting structure-side camera sub-assembly 38 includes a camera 110 and a third seal member 112. The camera 110 is secured to the camera electronics board 34. The third seal member 112 is secured to the camera electronics board 34 and seals with an outer surface of the camera 110.

With the shell piece 26 and the internal mounting structure 32 in the spaced relationship as shown, the third seal member 112 is slightly misaligned relative to the second seal member 108. The misalignment is because an axis of the first camera is at an angle relative to the direction that the internal mounting structure 32 is moved relative to the shell piece 26 from the spaced relationship to the assembled relationship. See FIG. 1. The combination of the first and second seal members 106 and 108 effectively creates a thicker seal member. Such a thicker seal member provides more "give" and has edges that have less of a tendency to roll up when the third seal member 112 comes in to contact with second seal member 108 and subsequent off-axis movement into the assembled relationship.

Figure 8:
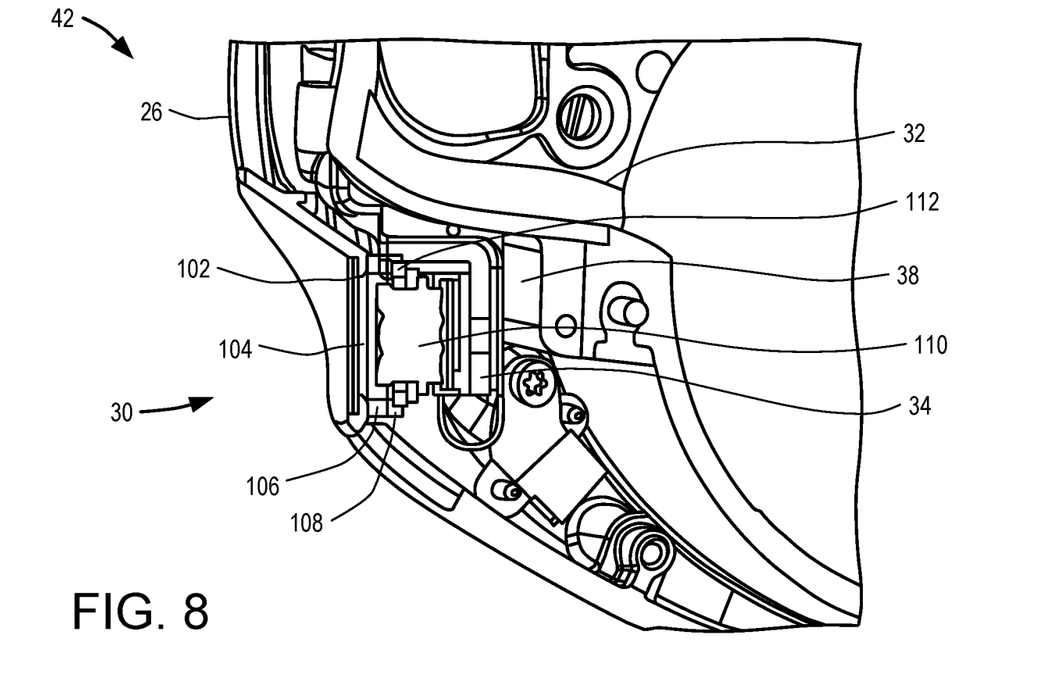
FIG. 8 is a cross-sectional side view on 8-8 in FIG. 2.

FIG. 8 is a cross-section on 8-8 in FIG. 2 and illustrates the second camera assembly after the third seal member 112 is engages with the second seal member 108. The third seal member 112 engages with the second seal member 108 at the same time that the first and second seal members 44 and 48 in FIG. 5 engage with one another.

Figure 9:
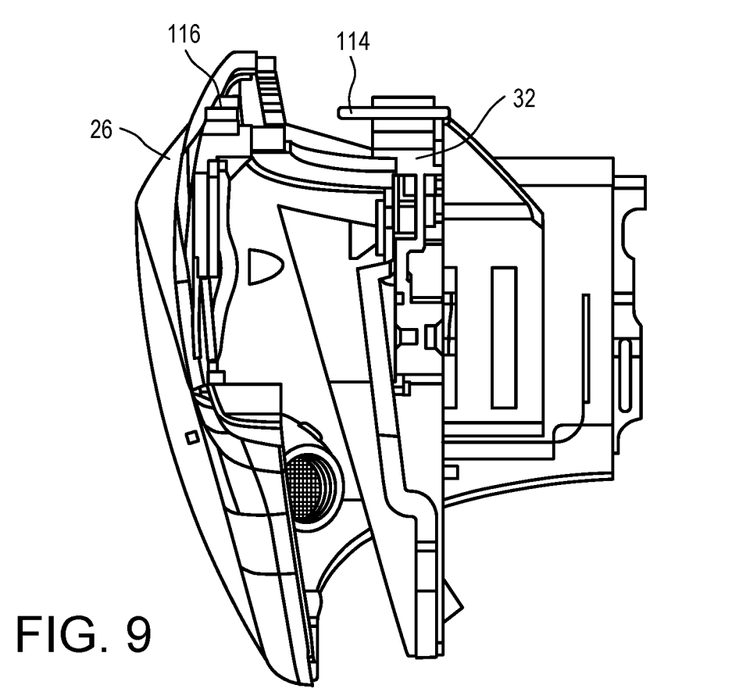
FIG. 9 is a cross-sectional side view on 9-9 in FIG. 1.
Figure 10:
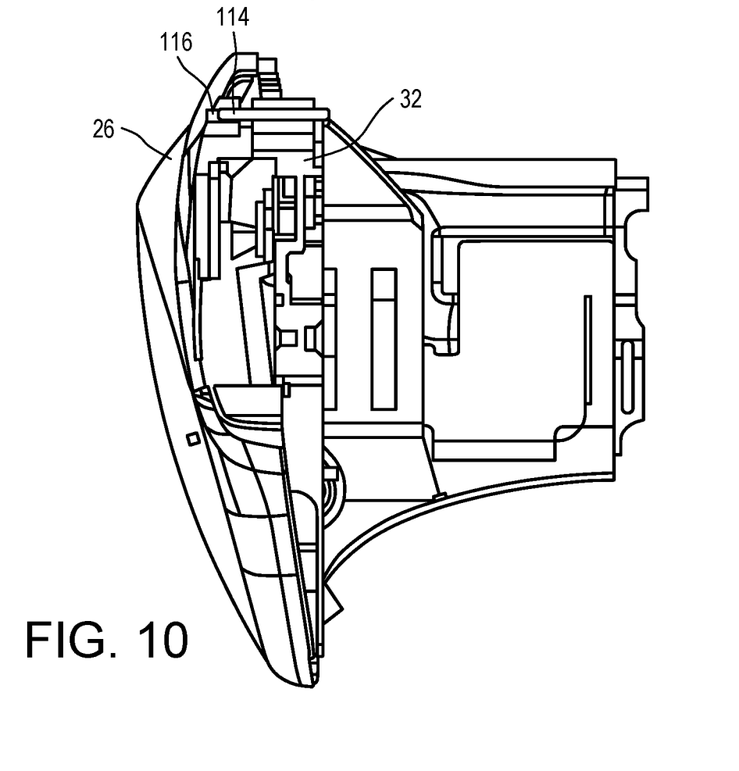
FIG. 10 is a cross-sectional side view on 10-10 in FIG. 2.
Figure 11:
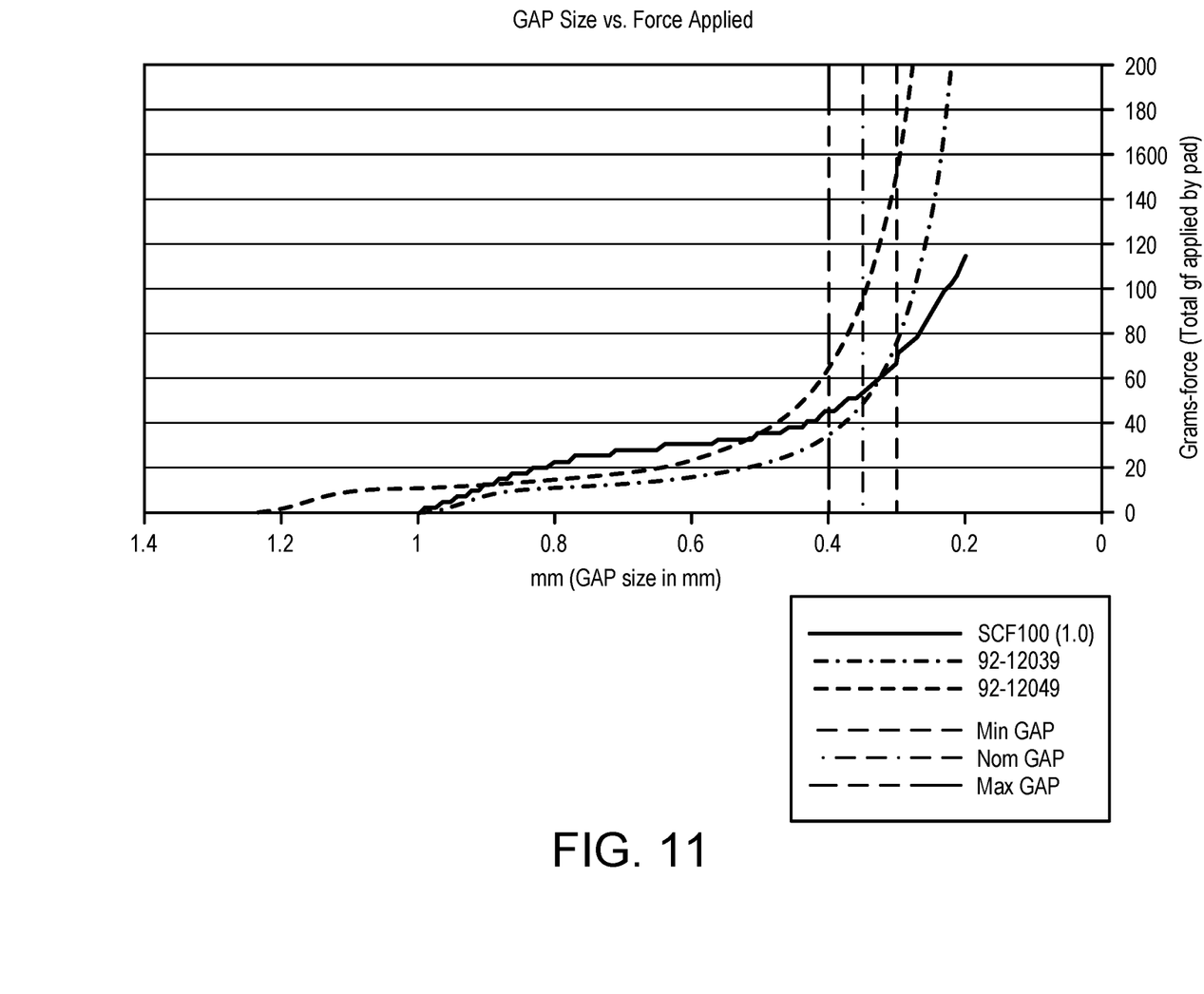
FIG. 11 is a graph showing hard stacking of various open cell foam materials.

FIGS. 9 and 10 are cross-sections on 9-9 in FIGS. 1 and 10-10 in FIG. 2, respectively. A fastener 114 is inserted though an opening in the internal mounting structure 32. The fastener 114 has thread on an external surface. A nut 116 is attached to the shell piece 26. The nut 116 has an internal surface that is threaded. In the spaced relationship shown in FIG. 9, the fastener 114 is secured to the internal mounting structure 32, but the fastener 114 is spaced from the nut 116. In the assembled relationship shown in FIG. 10, the fastener 114 is connected to the nut 116 by screwing the external thread of the fastener 114 into the internal thread of the nut 116. By securing the fastener 114 to the nut 116, the shell piece 26 is secured to the internal mounting structure 32. The seals that are formed between surfaces of the first and second seal members 44 and 48 in FIG. 5 and between the second and third seal members 108 and 112 in FIG. 7 remain intact because the shell piece 26 and the internal mounting structure 32 are secured in a fixed relationship relative to one another.

Manufacturing may require a 1.2 mm gap between components on the first and second main sub-assemblies 22, 24 that a seal has to fill. However, due to manufacturing tolerances such a gap can vary significantly. For example, the designed 1.2 mm gap can vary from a minimum gap of 0.6 mm to a maximum gap of 1.8 mm. It is thus required that the combined seal formed by the seal members be at least 1.8 mm in thickness and be compressible to 0.6 mm. A 200% compression may result in undesirable stresses if certain materials are used. Stresses between the first and second main sub-assemblies 22, 24 can result in deformations of one or more components of the sub-assemblies 22, 24. Deformations can cause changes in relationships between highly sensitive components, such as optical projectors and waveguide structures, and can significantly diminish quality of an image that is delivered to a user. Thus, manufacturing seal components from highly compressible materials can be advantageous in limiting a force applied to the main sub-assemblies 22, 24 during compression of seals disposed in gaps having high tolerance variance between the main sub-assemblies 22, 24. An open cell foam provides a material that has a very low spring constant and, for that reason, is a preferred material for the seal members described herein. Open cell foam may provide advantages over closed cell foam because open cell foam can have a lower spring constant than closed cell foam. Openings in open cell foam are still sufficiently small to prevent dust particles from passing therethrough. Open cell foam is also preferred over parts such as gromets or bellows-type parts because it is much easier to manufacture very tiny parts using open cell foam.

When an open cell material is compressed to a point where all of the open cells have been collapsed, hard stacking occurs. At the hard stacking point, any additional compression applied to the material is met with a high resistance because the material surrounding the open cells is being pushed into contact against itself rather than displacing under the compression. It is preferable that a seal member be made of a foam having an initial dimension that is compressible to a final dimension before hard stacking wherein the final dimension is less than 10% of the initial dimension. Open cell foam can be compressed more than closed cell foam before hard stacking occurs. FIG. 2 shows changing spring constant curves of three different materials. The first material (SCF100) is preferred over the second and third materials (92-12039 and 92-12049) because the first material can be compressed to less than 20% of its initial size before hard stacking. In particular, when the first material is compressed, its spring constant at 20% compression is only double its spring constant at 50% compression.

The seal material preferably reduces its resistance to compression force over a short period of time, i.e. compression setting occurs relatively quickly. Compression set of a material can be defined as the amount of permanent deformation that occurs as a result of force applied to the compressible material. The permanent deformation that occurs over exposure to the compressed state results in a decreasing resistance force applied to the components that are causing the compression of the seal. Preferably, the force that is created by the compression of the seal material reduces by 50% in less than 5 minutes. Such a reduction in the force further reduces stresses on other components of the viewing device such as the camera or other electronic or optical components.

A seal material that has high compressibility can prove difficult to fabricate in certain dimensions. For example, if the annular dimension of the seal is small but the thickness of the seal is large, the seal may be difficult to form using traditional methods, such as die cutting. To improve seal quality and tolerances, two shorter seals having reduced thicknesses can be fabricated and then stacked on each other to total the designed thickness of the seal component. This solution allows for thick seals to be formed from highly compressible materials for use in high-precision devices, such as the visual system described herein, where any additional force imparted to the assemblies carrying precision aligned components can disturb their positional relationships and reduce overall performance of the system.

A visual system may include the two cameras that have been described as part of a set of four to six cameras that are used together with a depth sensor to capture objects and to determine distances to the objects. A head pose and position and position of a user can be determined by processing imagery from the visual system using a simultaneous localization and mapping (SLAM) and visual odometry procedure. Such continual processing of the images provides data that indicates movement of the viewing device relative to the objects. Because the depth sensor and a gravity sensor determine the locations of the objects relative to gravitation force, the cameras can detect movement of the viewing device relative to gravitation force. The viewing device has a see-through waveguide and a projector projects an image through the waveguide on to a retina of an eye of the user. The user thus sees a rendered object within a real world environment. The objects remain fixed within the real world environment even when the user moves their head. The stationary position of the objects is made possible because the viewing system is used to determine objects in the real world environment relative to the view of the user when the user moves their head.

While the seals are referred to as circular throughout the description, one of skill in the art will appreciate that the concept of fabricating a highly compressible seal with a high thickness-to-width ratio can apply to many shapes and designs for gaskets or seals. While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A viewing device comprising:
   a shell piece defining a first window opening;
   an internal mounting structure secured to the shell piece;
   a first camera assembly including:
     a transparent window mounted to the shell piece over the first window opening, the transparent window having a periphery that makes continuous contact with the shell piece;
     a camera having a lens, the camera being mounted to the internal mounting structure with a gap defined between the lens and the window; and
   a seal having a first external surface contacting the shell piece and a second external surface contacting the camera so that a closed front cavity is defined jointly by the window, the lens and the seal, wherein the seal includes first and second seal members having first and second engagement surfaces, respectively, that make contact with each other, wherein the first and second seal members are attached to the shell piece and the internal mounting structure respectively, wherein the internal mounting structure and the shell piece are moved towards each other to cause the first and second engagement surfaces to come into contact with each other, wherein the first and second engagement surfaces are deformed when the shell piece and the internal mounting structure are moved towards each other.

2. The viewing device of claim 1, wherein the window opening is circular and the periphery of the window is circular.

3. The viewing device of claim 2, wherein the first external surface is circular.

4. The viewing device of claim 1, wherein the second external surface is circular.

5. The viewing device of claim 1, wherein the first and second seal members are made of foam.

6. The viewing device of claim 5, wherein the foam is an open cell foam.

7. The viewing device of claim 5, wherein the second seal member is a cylindrical member with a front face, a rear face, an outer surface and an inner surface, wherein the second engagement surface includes the front face, the second external surface includes the inner surface.

8. The viewing device of claim 5, further comprising:
   an adhesive between the rear face and the mounting structure.

9. The viewing device of claim 8, wherein the rear face has an outer annulus and an inner annulus, the outer annulus being further from the camera than the inner annulus, and the adhesive is located on the outer annulus and not on the inner annulus.

10. The viewing device of claim 1, wherein the seal is made of foam having an initial dimension that is compressible to a final dimension before hard stacking, wherein the final dimension is less than 10 percent of the initial dimension.

11. The viewing device of claim 1, wherein the seal is made of foam having an initial dimension that is compressible to a final dimension, wherein the compression creates a force and compression setting occurs wherein the force reduces over time.

12. The viewing device of claim 11, wherein the force reduces by 50 percent in less than five minutes.

13. The viewing device of claim 1, wherein the seal is an annular seal that surrounds the camera the second external surface makes continuous contact with the camera around the camera.

14. The viewing device of claim 1, wherein the shell piece defined a second window opening, further comprising:
   a second camera assembly including:
     a transparent window mounted to the shell piece over the window first opening, the window having a periphery that makes continuous contact with the shell piece;
     a camera having a lens, the camera being mounted to the internal mounting structure with a gap defined between the lens and the window; and
     a seal having a first external surface contacting the shell piece and a second external surface contacting the camera so that a closed front cavity is defined jointly by the window, the lens and the seal.

15. The viewing device of claim 14, wherein the shell piece and the internal mounting structure are moved from a spaced relationship to an assembled relationship relatively towards one another to form the closed cavity of the first camera assembly and the closed cavity of the second camera assembly.

16. The viewing device of claim 15, wherein the seals of the first and second camera assemblies are deformed when the shell piece and the internal mounting structure are moved relatively towards one another.

17. The viewing device of claim 16, further comprising:
   a fastener that retains the shell piece and the internal mounting structure in the assembled relationship.

18. A method of constructing a viewing device comprising:
   mounting a transparent window to a shell piece over the window opening defined by the shell piece, the window having a periphery that makes continuous contact with the shell piece;
   mounting a camera to an internal mounting structure;
   locating a seal between the shell piece and the internal mounting structure; and
   securing the internal mounting structure to the shell piece with a gap defined between a lens of the camera and the window and with the seal having a first external surface contacting the shell piece and a second external surface contacting the camera so that a closed front cavity is defined jointly by the window, the lens and the seal, wherein the seal includes first and second seal members having first and second engagement surfaces, respectively, that make contact with each other, wherein the first and second seal members are attached to the shell piece and the internal mounting structure respectively, wherein the internal mounting structure and the shell piece are moved towards each other to cause the first and second engagement surfaces to come into contact with each other, wherein the first and second engagement surfaces are deformed when the shell piece and the internal mounting structure are moved towards each other.

19. The viewing device of claim 18, wherein the seal includes first and second seal members that are attached to the shell piece and the internal mounting structure, respectively, and having first and second engagement surfaces, respectively, that make contact with each other.

20. The viewing device of claim 19, further comprising: moving the internal mounting structure and the shell piece towards each other to cause the first and second engagement surfaces to come into contact with each other.

21. The viewing device of claim 20, wherein the first and second engagement surfaces are deformed when the shell piece and the internal mounting structure are moved towards each other.

22. A viewing device comprising:
a shell piece defining a first window opening;
an internal mounting structure secured to the shell piece;
a first camera assembly including:
a transparent window mounted to the shell piece over the first window opening, the transparent window having a periphery that makes continuous contact with the shell piece;
a camera having a lens, the camera being mounted to the internal mounting structure with a gap defined between the lens and the window; and
a seal having a first external surface contacting the shell piece and a second external surface contacting the camera so that a closed front cavity is defined jointly by the window, the lens and the seal, wherein the seal is made of foam having an initial dimension that is compressible to a final dimension before hard stacking, wherein the final dimension is less than 10 percent of the initial dimension.

23. A viewing device comprising:
a shell piece defining a first window opening;
an internal mounting structure secured to the shell piece;
a first camera assembly including:
a transparent window mounted to the shell piece over the first window opening, the transparent window having a periphery that makes continuous contact with the shell piece;
a camera having a lens, the camera being mounted to the internal mounting structure with a gap defined between the lens and the window; and
a seal having a first external surface contacting the shell piece and a second external surface contacting the camera so that a closed front cavity is defined jointly by the window, the lens and the seal, wherein the seal is made of foam having an initial dimension that is compressible to a final dimension, wherein the compression creates a force and compression setting occurs wherein the force reduces over time.

24. A viewing device comprising:
a shell piece defining a first window opening;
an internal mounting structure secured to the shell piece;
a first camera assembly including:
a transparent window mounted to the shell piece over the first window opening, the transparent window having a periphery that makes continuous contact with the shell piece;
a camera having a lens, the camera being mounted to the internal mounting structure with a gap defined between the lens and the window; and
a seal having a first external surface contacting the shell piece and a second external surface contacting the camera so that a closed front cavity is defined jointly by the window, the lens and the seal; and
a second camera assembly including:
a transparent window mounted to the shell piece over the window first opening, the window having a periphery that makes continuous contact with the shell piece;
a camera having a lens, the camera being mounted to the internal mounting structure with a gap defined between the lens and the window; and
a seal having a first external surface contacting the shell piece and a second external surface contacting the camera so that a closed front cavity is defined jointly by the window, the lens and the seal.

25. A method of constructing a viewing device comprising:
mounting a transparent window to a shell piece over the window opening defined by the shell piece, the window having a periphery that makes continuous contact with the shell piece;
mounting a camera to an internal mounting structure;
locating a seal between the shell piece and the internal mounting structure; and
securing the internal mounting structure to the shell piece with a gap defined between a lens of the camera and the window and with the seal having a first external surface contacting the shell piece and a second external surface contacting the camera so that a closed front cavity is defined jointly by the window, the lens and the seal, wherein the first and second engagement surfaces are deformed when the shell piece and the internal mounting structure are moved towards each other.

* * * * *